United States Patent [19]

Weis

[11] Patent Number: 4,614,589

[45] Date of Patent: Sep. 30, 1986

[54] METHOD AND APPARATUS FOR BIOLOGICAL AEROBIC WASTEWATER TREATMENT

[75] Inventor: Frank G. Weis, Kansas City, Mo.

[73] Assignee: Smith & Loveless, Lenexa, Kans.

[21] Appl. No.: 700,757

[22] Filed: Feb. 12, 1985

[51] Int. Cl.$^4$ .......................... C02F 3/18; C02F 11/12; B01D 21/02

[52] U.S. Cl. .................................... 210/608; 210/614; 210/628; 210/629; 210/194; 210/202; 210/534; 210/536; 210/538; 210/926

[58] Field of Search ............... 210/926, 194, 629, 626, 210/627, 628, 534, 535, 533, 536, 538, 200, 201, 202, 539, 614, 744, 776, 608

[56] References Cited

U.S. PATENT DOCUMENTS

| | | |
|---|---|---|
| 3,140,259 | 7/1964 | Kelly . |
| 3,291,316 | 12/1966 | Kelly . |
| 3,298,529 | 1/1967 | Longnecker . |
| 3,333,695 | 7/1967 | Van Note . |
| 3,511,380 | 5/1970 | Rice et al. . |
| 3,666,111 | 5/1972 | Pielkenrood et al. . |
| 3,666,112 | 5/1972 | Pielkenrood et al. . |
| 3,721,347 | 3/1973 | Pielkenrood et al. . |
| 3,730,881 | 5/1973 | Armstrong . |
| 3,759,495 | 9/1973 | Boler et al. . |
| 3,782,557 | 1/1974 | Pielkenrood . |
| 3,900,394 | 8/1975 | Rongved . |
| 3,940,337 | 2/1976 | Robison . |
| 4,111,802 | 9/1978 | Louboutin . |
| 4,159,243 | 6/1979 | Okey . |
| 4,190,534 | 2/1980 | Wyatt . |
| 4,199,452 | 4/1980 | Mandt ................................ 210/926 |
| 4,221,656 | 9/1980 | Kennedy . |
| 4,226,717 | 10/1980 | Malm . |
| 4,244,815 | 1/1981 | Chaikin et al. . |
| 4,303,516 | 12/1981 | Stensel et al. . |
| 4,305,819 | 12/1981 | Kobozev et al. . |
| 4,338,195 | 7/1982 | Treyssac . |
| 4,351,733 | 9/1982 | Salzer et al. . |
| 4,362,625 | 12/1982 | Beard . |
| 4,383,922 | 5/1983 | Beard . |
| 4,443,338 | 4/1984 | Reid . |
| 4,446,018 | 5/1984 | Cerwick . |
| 4,455,232 | 6/1984 | Reid . |
| 4,455,239 | 6/1984 | Morrow et al. . |
| 4,457,844 | 7/1984 | Beard . |
| 4,460,471 | 7/1984 | Reid . |
| 4,487,692 | 12/1984 | Kersten . |
| 4,490,255 | 12/1984 | Johnson .............................. 210/536 |
| 4,512,895 | 4/1985 | Reid . |
| 4,533,470 | 8/1985 | Gyulavari ........................... 210/926 |

FOREIGN PATENT DOCUMENTS

| | | | |
|---|---|---|---|
| 205597 | 10/1923 | United Kingdom ................ | 210/926 |
| 2080276 | 2/1982 | United Kingdom ................ | 210/926 |
| 282165 | 1/1971 | U.S.S.R. .............................. | 210/926 |

OTHER PUBLICATIONS

United Industries, Inc., *Information & Application Data on the Boat Clarifier*, Sep. 1983.
Armco Construction Products Division, *Armco BMTS Treatment Systems*, Sep. 1983.
Beloit-Passavant Corporation, *Mammoth Rotor Aerator High Rate Aeration Complete Mixing*, Bulletin 5300.

*Primary Examiner*—Benoit Castel
*Attorney, Agent, or Firm*—Dressler, Goldsmith, Shore, Sutker & Milnamow

[57] ABSTRACT

A method and apparatus for biological aerobic treatment of wastewater wherein oxygen is induced into a mixed liquor flow path and a method and apparatus for separating the liquid withdrawn from the mixed liquor flow path into a clear liquid stream and a flock laden stream. A streaming specific gravity separator of unique construction and operation separates the mixed liquor into a clear liquid stream and a flock laden stream, withdrawing the clear liquid stream from the system and directing the flock laden stream back into the mixed liquor flow path. The separator functions within the system to be self-controlling for load increases or decreases.

In accordance with preferred embodiments of the system, the separator may be positioned inside or outside of an oxidation ditch. The separator may also be utilized in combination with an aeration basin.

56 Claims, 16 Drawing Figures

METHOD AND APPARATUS FOR BIOLOGICAL AEROBIC WASTEWATER TREATMENT

FIELD OF THE INVENTION

The present invention relates to a method and apparatus for biological aerobic treatment of wastewater such as sewage, industrial waste or the like. More specifically, the present invention is directed to a method and apparatus for biological aerobic treatment of wastewater of the type wherein the wastewater is circulated in a continuous mixed liquor flow path within an oxidation ditch and air or oxygen is added thereinto to promote micro-organism growth. The present invention is further directed to a method and apparatus for separating the liquid withdrawn from the mixed liquor flow path into a clear liquid stream and a flock laden stream and withdrawing the clear liquid stream and returning the flock laden stream back into the mixed liquor flow path.

BACKGROUND OF THE INVENTION

Generally, the present invention is concerned with the treatment of wastewaters which contain biodegradable solids. Such wastewater may emanate from sewage collection systems, oil refineries, coke plants, paper making plants, canneries, food processing plants and the like. The treatment of these organic dissolved and suspended materials is typically accomplished by a process commonly classified as an aerobic treatment process. Removal of the organic material by these processes is accomplished by two general mechanisms. First, impurities are adsorbed or adsorbed at the interface between the associated biomass and the wastewater. Second, the biomass decomposes these organics through oxidation. The resulting increased biomass or sludge consisting of accumulated micro-organisms is generally separated from the organically stabilized liquid. Most of the biomass is generally returned to the process to continue the process and the excess sludges are periodically removed from the system.

In conventional biological treatment systems, the major components are typically an aeration basin and a clarifier tank. The aeration tank may be rectangular or circular and contain means for continually circulating the mixed liquor (suspended solids and waste liquid) within the tank with the addition of oxygen or air to promote micro-organism growth. The aeration basin may also be generally oval in shape and define a trough-like channel having bottom and spaced upstanding side walls for retaining and circulating the mixed liquor in a continuous substantially closed flow path, which is often referred to as an "oxidation ditch". The mixed liquor is continuously circulated by means of rotating brushes, discs, turbines or the like, at a flow velocity to maintain the solids in suspension. Additional air or oxygen may also be added to the circulating mixed liquor to promote micro-organism growth.

In both the aeration basin system and the oxidation ditch system, a clarifier is required to separate suspended solids from the mixed liquor and to withdraw clarified liquid. The clarifier is typically a separate unit located adjacent the aeration tank or oxidation ditch, and serves as settling tank for separating suspended solids from the mixed liquor by gravity. The clarified liquid may be disposed of or reused, while the settled biomass remains in the clarifier, from which it may be disposed of as waste sludge, or recycled to the aeration tank or oxidation ditch to maintain the proper balance between organic loading and biological microbial mass solids in the mixed liquor. The separate clarifiers typically require pumping means to transmit mixed liquor from the aeration basin or oxidation ditch to the clarifier and/or pumping means to transmit the settled biomass from the clarifier back into the aeration basin or oxidation ditch. The separate clarifiers also require slow speed scraper drive and scrapers to remove the settled sludge therefrom. It has been found that the use of such separate clarifiers not only require significant installation and material costs together with land space for the clarifier installation, but also a significant expenditure of energy resources to remove the settled sludge from the clarifier, as well as to move the sludge between the aeration basin or oxidation ditch and the clarifier.

In an effort to resolve these problems, in recent years there have been various system proposals to provide internal clarifier devices positioned within the oxidation ditch. These clarifier devices are commonly referred to as intrachannel clarifiers. Examples of such intrachannel clarifiers are disclosed in U.S. Pat. Nos. 4,303,516, 4,383,922, and 4,446,018.

While such proposed systems have eliminated or reduced some of the above enumerated problems associated with systems employing separate clarifiers and oxidation ditches, they are not without drawbacks of their own. For example, certain of these proposed systems incorporate intrachannel clarifier basins supported within the oxidation ditch above the bottom of the ditch or aeration section, which substantially fill the cross section of the aeration channel in order to increase the velocity in the channel to create a lower head. This increases the head that the circulation device, i.e. the brush aerator, must work against and thus lowers velocity and oxygen transfer as well as increasing horsepower. Essentially, the intrachannel clarifiers operate more or less as conventional gravity settling clarifiers. They typically require intricate bottom baffling arrangements to return the settled solids to the aeration channel through large open areas in the bottom of the clarifier basin. There is a tendency for the turbulent flow in the aeration channel to divert some of the flow upwardly through these large open areas and thereby disturb the settling flow. Further, it is necessary to carefully control the flow velocity in the aeration channel to prevent withdrawing excess solids and liquid through the large number and large area of the openings in the bottom of the clarifier basin.

The aeration and mixing section of the oxidation ditch requires the inducement of oxygen into solution in the mixed liquor. The oxygen must be supplied in a volume required by the BOD load and flow rate. The flow rate through the oxidation ditch may vary as much as 10 to 1 in small systems and 2 to 1 in large systems. On domestic sewage and many industrial wastes the BOD load in the mixed liquor flow path remains relatively constant per unit volume. To satisfy this oxygen demand, this variation has heretofore been typically handled by supplying oxygen at a rate sufficient to handle the peak load through the system and letting the excess oxygen build up the dissolved oxygen level at reduced flows. The dissolved oxygen built up at low flows reduces the amount of oxygen transferred and is thereby inefficient in operation and uses excess amounts of energy. It has been proposed to provide long mechanical weirs within the oxidation ditch, requiring intricate sealing and manual operators, to adjust the liquid level in the oxidation ditch and thereby control the oxygen transfer rate. Placement of such weirs in the oxidation ditch frequently results in a wave action in the oxidation ditch and, as the waves splash over the weir, a dewatering effect results causing a drop in aeration of the mixed liquor. This effect may happen at various levels in the oxidation ditch and often requires other aeration to avoid this problem.

In recently issued U.S. Pat. No. 4,487,692, a wastewater treatment system is proposed which includes a clarifier mounted on a wall defining a closed loop oxidation ditch. The system utilizes brush aerators for moving the mixed liquor through a flow path in the ditch and to introduce oxygen into the mixed liquor. The clarifier is narrow and elongated in relation to the flow path. The clarifier has closed side walls and end walls and an open lower end to permit mixed liquor flow from the oxidation ditch to enter therethrough. The mixed liquor flows vertically upward from the lower end to the upper end at a sufficiently low velocity to permit organic solids entering the clarifier to exit therefrom under the influence of gravity through the same open lower end through which the mixed liquor flow enters. The lower end is provided with vertically extending baffles disposed across the flow path in much the same manner as the prior intrachannel clarifiers. As with the prior intrachannel clarifiers, the upward flow therethrough slows down settling and reduces the efficiency of the clarifier. The low velocity flow through the clarifier is controlled by a plurality of means provided along the length of the clarifier for withdrawing treated or clear liquid from the upper end of the clarifier. This means includes a plate or a weir having a number of openings formed therein at a common elevation below the liquid level in the oxidation ditch. The effluent launder which receives the clear liquid is provided with a mechanically adjustable weir which may be manually adjusted to regulate the liquid level in the oxidation ditch and thereby control the rate of oxygen transfer within the system. The weir must be manually adjusted to vary the liquid level in the oxidation ditch and does not automatically adjust such level in proportion to the influent flow into the oxidation ditch.

SUMMARY OF THE INVENTION

The present invention is directed to various embodiments of a method and apparatus for biological aerobic treatment of sewage, and other industrial wastewaters in a system, such that a clear effluent of low BOD and solids content is produced, which utilizes a minimum of energy and operator attention. The system is preferably confined within an oxidation ditch and thereby eliminates separate clarifiers, sludge return or process flow pumps, and interconnecting piping. The system is preferably self-controlling for load increases or decreases so that manual operator control or automatic instrumentation is reduced or eliminated. The system is economical to fabricate and easy to observe and maintain.

In accordance with a preferred embodiment of a biological aerobic treatment system incorporating the method and apparatus of the present invention, the wastewater to be treated is introduced into and caused to flow in a mixed liquor stream flow path within a closed loop oxidation ditch. The mixed liquor flow path preferably has a concentration of solid particulates therein to cause a mutual attraction of the solid particulates and thereby create a flock structure which substantially flows as a liquid mass at a sufficient velocity to prevent settling of suspended solid particulates. The system includes a means for inducing oxygen into the mixed liquor flow path, such as a brush aerator, which preferably induces oxygen into the mixed liquor flow path in a volume proportional to the liquid level of the flow path in the oxidation ditch.

In accordance with a unique aspect of the invention, the system utilizes a streaming specific gravity separator to separate and remove clear liquid from the mixed liquor flow path. The separator is preferably positioned within and alongside an outer side wall of the oxidation ditch and includes an elongated longitudinally extending tank defined by a pair of spaced side walls, a pair of spaced end walls and a floor extending between the side walls and end walls. The upstream section of the separator is provided with an inlet port for receiving an influent stream of mixed liquor from the flow path. The influent stream flows in a substantially horizontal direction from the upstream section towards a downstream section of the separator at a velocity which substantially precludes solid particulates from settling within the influent stream and which maintains the flock structure of the solid particulates within the influent stream, such that, as the influent stream flows towards the downstream section of the separator, clear liquid separates upwardly to form a clear liquid stream positioned above a flowing flock laden stream. The velocity of the flock laden stream is preferably maintained at a greater velocity than the velocity of the clear liquid stream. Liquid from the clear liquid stream is withdrawn from an upper portion of the downstream section and the flock laden stream is withdrawn from a lower portion of the downstream section and directed back into the flow path.

In accordance with a further unique aspect of the invention, the clear liquid is directed into a longitudinally extending clear liquid effluent trough positioned in an upper portion of the downstream section of the separator. The trough preferably includes a side wall having a plurality of openings formed therein, oriented at different vertical elevations, through which the clear liquid flows so as to vary the level of the mixed liquor within the oxidation ditch in proportion to the volume of wastewater entering the oxidation ditch. In so doing, the volume of oxygen induced into the mixed liquor flow path is in proportion to the volume of wastewater entering the oxidation ditch. An alternative preferred embodiment of the invention utilizes a proportional flow weir arrangement to control the volume of oxygen induced into the flow path.

Alternative preferred embodiments of the invention are disclosed wherein the separator of the present invention is positioned outside of the oxidation ditch and/or in combination with an aeration basin.

Other features of the invention will become apparent from the detailed description which follows.

DESCRIPTION OF PREFERRED EMBODIMENTS

Referring to FIGS. 1-9, a biological aerobic wastewater treatment system in accordance with the present invention is indicated generally at 10 in conjunction with an oxidation ditch 12 of conventional construction. As will hereinbelow become more apparent, the inventive principles of the present invention may be applied in other types of wastewater treatment systems, i.e., in systems wherein the wastewater is treated in an aeration basin.

Figures 1, 2, 3:
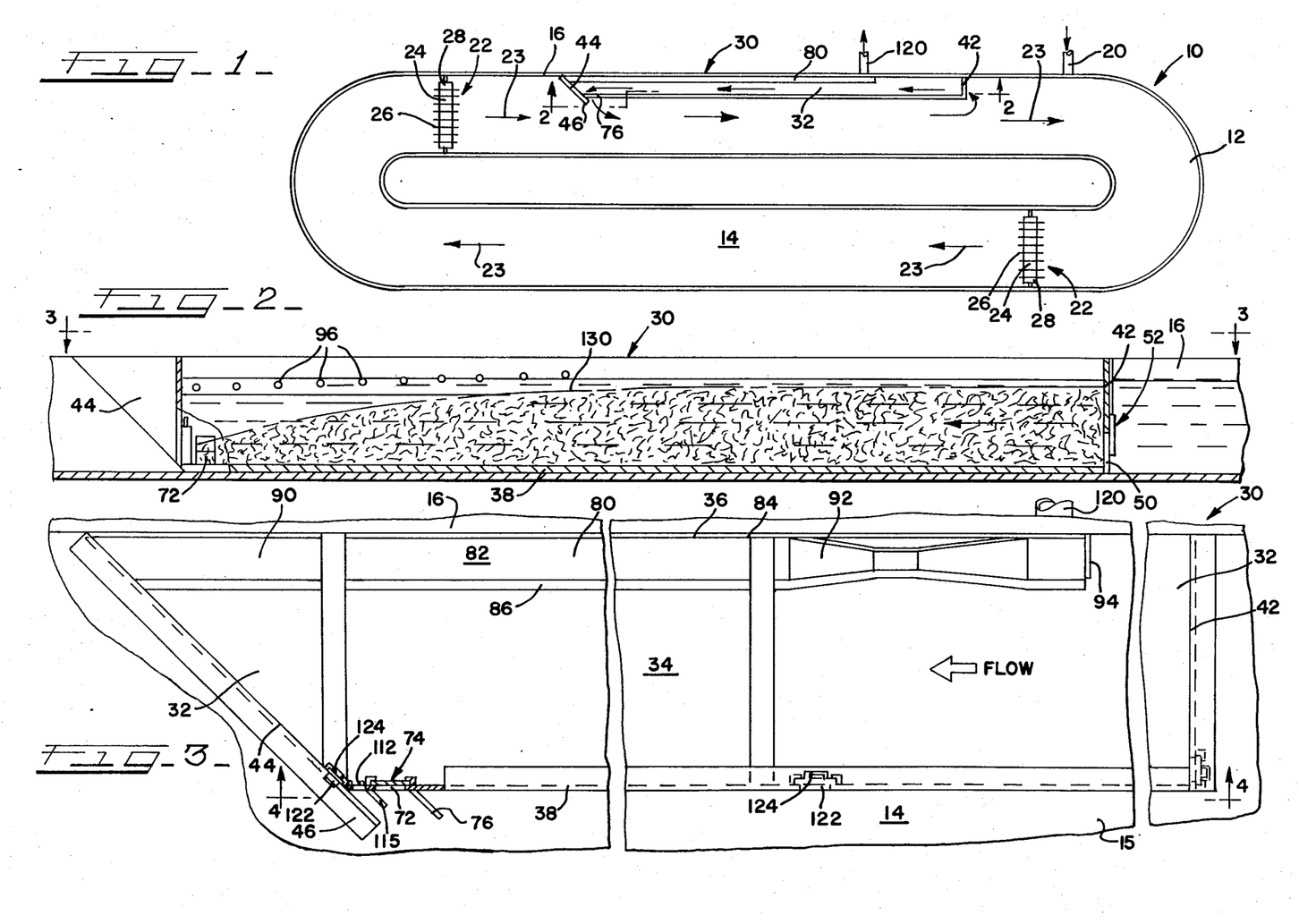
FIG. 1 is a schematic top plan view of a typical oxidation ditch wastewater treatment system incorporating the streaming specific gravity separator of the present invention.
FIG. 2 is an enlarged fragmentary cross sectional view, partially broken away, of the separator constructed in accordance with the present invention taken along line 2—2 of FIG. 1.
FIG. 3 is an enlarged fragmentary top plan view, partially broken away, of the separator constructed in accordance with the present invention taken along line 3—3 of FIG. 2.
Figures 7, 8, 9:
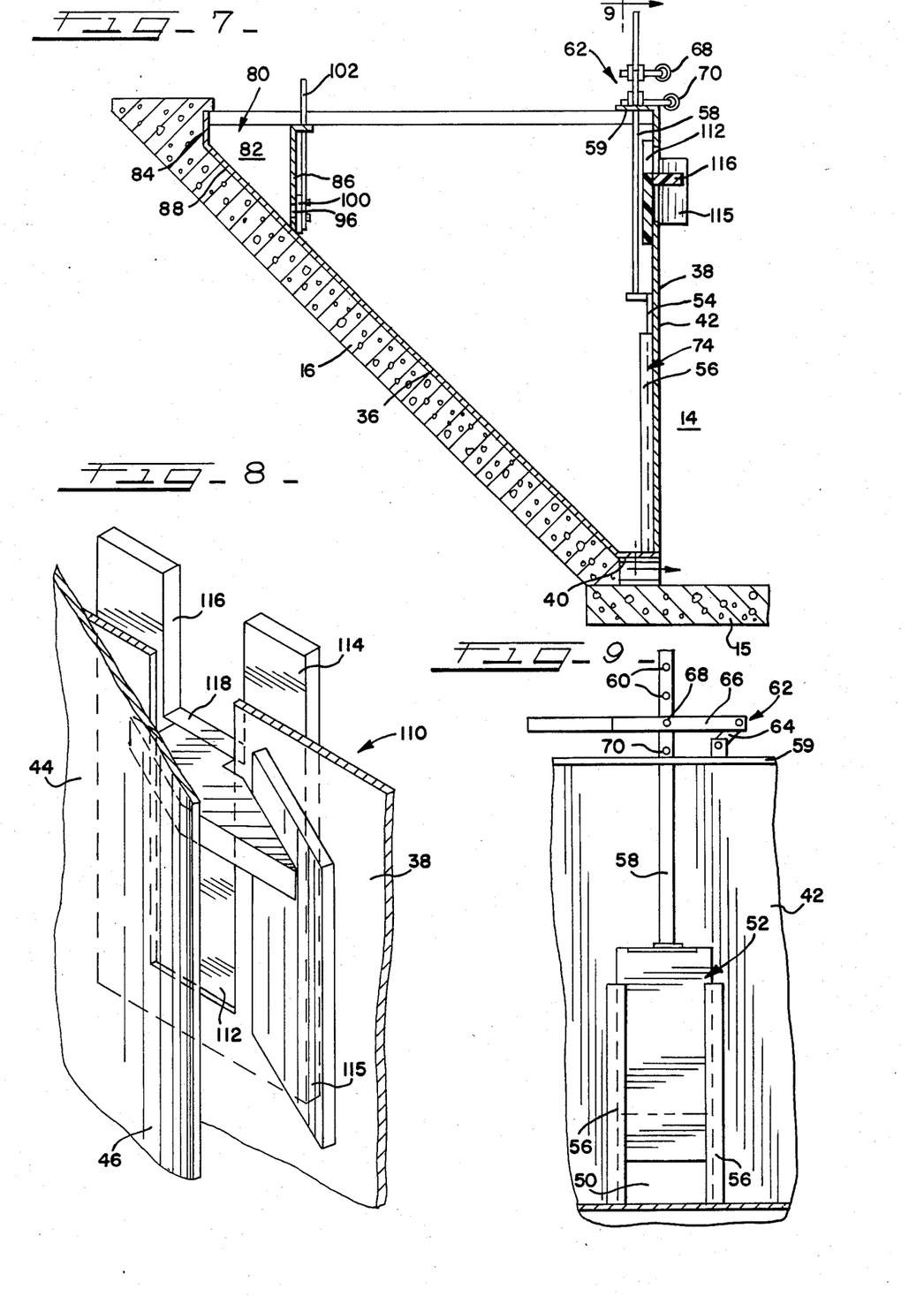
FIG. 7 is an enlarged fragmentary cross sectional view of the separator constructed in accordance with the present invention taken along line 7—7 in FIG. 4.
FIG. 8 is an enlarged fragmentary perspective view of a section of the separator constructed in accordance with the present invention illustrating a floating skimmer arrangement constructed in accordance with the present invention.
FIG. 9 is a fragmentary cross sectional view of a section of the separator constructed in accordance with the present invention taken along line 9—9 in FIG. 7 illustrating the gate control assembly.

As best seen in FIG. 1, wastewater treatment system 10 comprises an oval or race track-shaped oxidation ditch 12, of conventional construction, defining a trough-like channel 14 having a bottom 15 (as seen in FIG. 7) and spaced upstanding side walls 16 and 18 for retaining the mixed liquor in a continuous substantially closed flow path. Channel walls 16 and 18 may be positioned vertically, or inclined downwardly and inwardly as illustrated in FIG. 7, such that the flow channel is wider at the top than at the bottom. Oxidation ditch 12 may be constructed from any suitable material such as earth, concrete, fiberglass, steel or the like, and may be embedded in the ground to facilitate construction of the channel.

An inlet pipe or conduit 20 is provided for introducing wastewater influent into the flow path of mixed liquor in the oxidation ditch. In accordance with the preferred embodiment of the invention, inlet pipe 20 is positioned to introduce the influent wastewater into the channel 14 after the separator (as described hereinbelow) and before the return bend of the channel, as shown in FIG. 1. In so doing, the wastewater gets mixed with the treated floc as it passes around the bend by the hydraulically induced roll of the flow path perpendicular to the axis of the ditch. The bottom of the flow path rolls up the outside wall 16 and the surface of the flow paths rolls down the inside wall 18, thereby mixing the incoming wastewater with the circulating mixed liquor. This results in complete mixing of the influent wastewater with the mixed liquor, in a minimum length of the ditch, and thereby provides maximum length of flow path treatment before reaching the separator.

Means 22 are provided for aerating and moving the mixed liquor flow path in a single substantially horizontal direction in the channel 14, as indicated by directional arrows 23, at a velocity to prevent settling of suspended solid particulates therein and to maintain the concentration of solid particulates therein to cause a mutual attraction of the particulates and thereby create a flock structure which substantially flows as a liquid mass. The velocity of the flow path within channel 14 is preferably in the range of about 0.5 to 3 ft./sec. As illustrated in FIG. 1, means 22 are preferably positioned immediately downstream of the return bends of channel 14.

Moving means 22 may comprise any one or ones of a number of different types of aerators or pumping mechanisms. For example, means 22 may comprise turbines, diffused air aeration systems, a combination of propellers and diffused air aeration systems or the like. In accordance with a preferred embodiment of the invention, means 22 is a brush aerator 24 having a plurality of brush-like bristles or slotted discs 26 attached to a slowly rotating horizontal shaft 28 extending tranversely across channel 14, in contact with the mixed liquor flow path. The brush aerator agitates and aerates the mixed liquor, and at the same time imparts a velocity vector to create unidirectional flow. As is well known in the art, the rate of transfer of oxygen into the mixed liquor by the brush aerator is directly proportional to the depth in which the discs 26 are submerged in the flow path and consequently the level of liquid in channel 14.

The biological aerobic wastewater treatement system described hereinabove is essentially conventional in nature, and well understood by those skilled in the art. However, as noted hereinabove, such systems generally require the use of either separate clarifiers or intrachannel clarifiers positioned within the channel for separating solids from the mixed liquor. Further, such systems generally require the use of mechanical weirs to adjust the liquid level in the oxidation ditch and thereby control the oxygen transfer rate. To eliminate the problems associated with such systems, the present invention utilizes a streaming specific gravity separator 30 to separate out clear liquid from the mixed liquor flow path. The present invention further provides a unique means for automatically controlling the volume of oxygen induced into the mixed liquor flow path in proportion to the volume of wastewater entering the oxidation ditch.

Referring to FIG. 1, a streaming specific gravity separator 30 is provided within channel 14, preferably adjacent to the outer side wall 16, intermediate brush aerator 24 and inlet pipe 20. Although not considered preferable, separator 30 may be provided adjacent to the inner side wall 18. The description of the structure and operation of separator 30 is made in conjunction with an oxidation ditch having an inclined outer side wall 16, however, separator 30 may similarly be provided in oxidation ditches having a vertical outer side wall with obvious minor modifications thereto.

Figure 4:
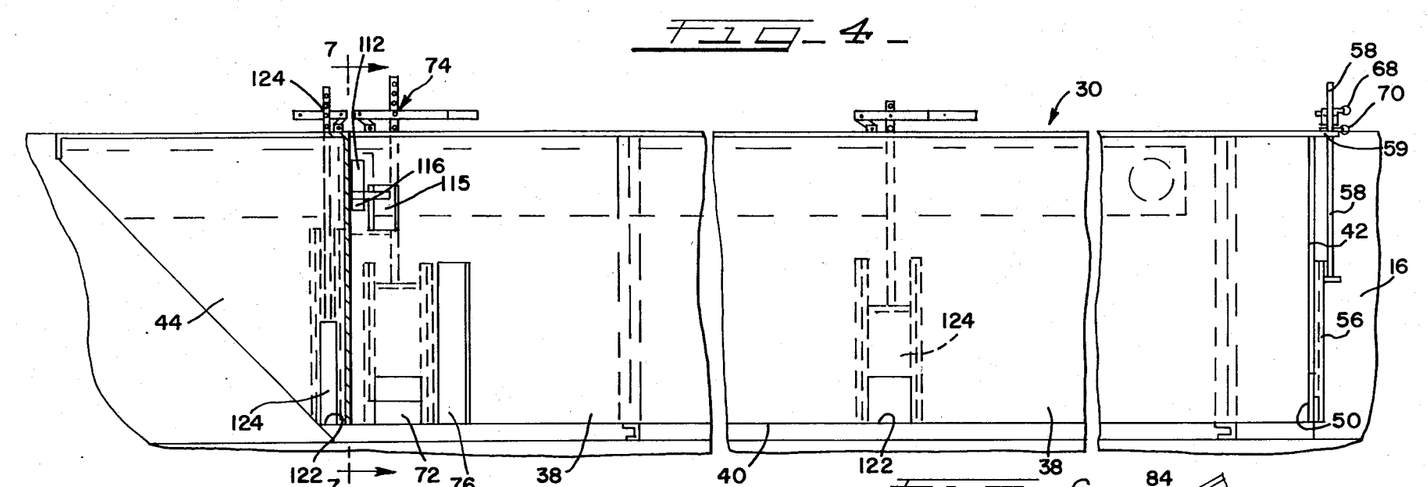
FIG. 4 is a fragmentary side elevation view of the separator constructed in accordance with the present invention taken along line 4—4 of FIG. 3.

Referring to FIGS. 1–4 and 7, separator 30 comprises an elongated, longitudinally extending, relatively narrow, tank 32 defining a flow zone 34 therein. Tank 32 is defined by a pair of spaced side walls 36 and 38, a floor 40 and a pair of end walls 42 and 44. As best seen in FIG. 7, side wall 36 is preferably inclined to conform to outer side wall 16 of channel 14 and side wall 38 preferably extends vertically upward from floor 40, which is suitably supported a short distance above bottom 15 of channel 14. As best seen in FIGS. 2–4, upstream end wall 42 is preferably a vertical wall extending between side walls 36 and 38 and floor 40. Downstream end wall 44 is preferably an inclined wall which is inclined downwardly and inwardly towards end wall 42. For reasons which will hereinbelow become more apparent, end wall 44 preferably extends a short distance beyond side wall 18 so as to define an inclined baffle portion 46 extending inwardly into channel 14.

Referring to FIGS. 2–4, 7 and 9, upstream end wall 42 is preferably provided with an inlet port 50 for receiving mixed liquor from channel 14 and directing same into tank 32. Inlet port 50 is preferably provided through a lower portion of end wall 42 and is provided with a control gate arrangement 52 to control the flow of influent liquid into separator 30. Inlet port 50 and control gate arrangement 52 may be of alternative constructions, an exemplary preferred construction is shown in FIGS. 7 and 9. Inlet port 50 is formed by a rectangular opening cut-out of end wall 42, the size of such opening being controlled by a vertically movable rectangular gate member 54. Gate 54 is slidably received within tank 32 between a pair of angle members 56 suitably secured to end wall 42 on either side of inlet port 50. The vertical positioning of gate 54 relative to port 50 is manually controlled by a suitable arrangement which permits the gate to be selectively locked in selected vertical positions relative to port 50. An exemplary arrangement includes a vertically extending control bar 58 extending through an inwardly extending flange 59 associated with an upper edge of end wall 42, having a lower end secured to gate 54 and an upper end having a plurality of vertically spaced openings 60 formed therein. The vertical movement of control bar 58 is controlled by a gate operator arrangement 62 pivotally secured to flange 59. Gate operator arrangement 62 comprises pivotal link members 64 and 66. Link members 66 have an opening formed therein through which a quick release pin 68 extends therethrough. A quick release pin 70 extends through a selected opening 60 in control bar 58 and rests on flange 59 to support gate 54 in its selected position. It can readily be appreciated that the size of port 50 may be selectively controlled dependent upon the selection of which opening 60 the pin 70 extends through.

Referring to FIGS. 2–4, an effluent port 72 is provided for directing flock laden effluent from tank 32 back into the flow path in channel 14. Effluent port 72 is preferably provided through a lower portion of side wall 38 adjacent its intersection with downstream end wall 44. Port 72 is preferably of a rectangular configuration and is provided with a suitable control gate arrangement 74 to control the flow of flock laden effluent therethrough. Control gate arrangement 74, in accordance with a preferred embodiment of the invention, is of similar construction and operation as control gate arrangement 52 and the parts thereof are identified by the same reference numerals. A baffle plate 76 is suitably secured to side wall 38 adjacent the edge of effluent port 72, extending at an acute angle into channel 14, substantially parallel to baffle portion 46.

Referring to FIGS. 2–7, an effluent trough 80 is positioned within tank 32 for receiving and directing at least a portion of the clear liquid stream from the tank 32. As will hereinbelow become more apparent, effluent trough 80 also varies the liquid level in tank 32 and channel 14 in proportion to the volume of wastewater entering oxidation ditch 12 and thereby controls the rate of oxygen transfer into the mixed liquor flow path.

Figures 5, 6:
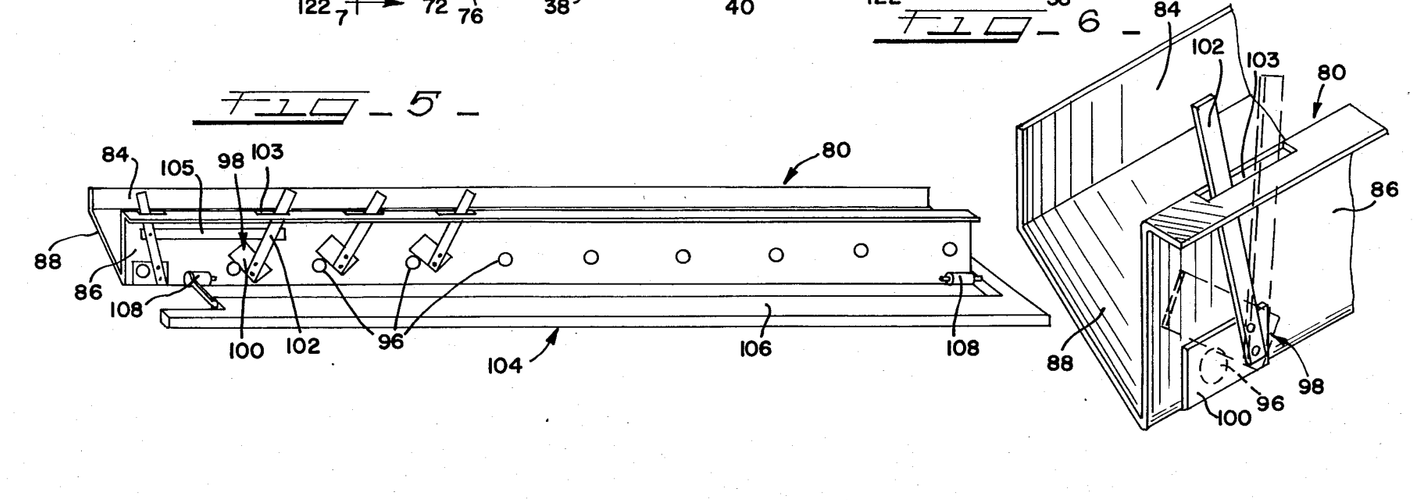
FIG. 5 is a fragmentary perspective view of the clear liquid effluent trough and scum baffle arrangement of the separator constructed in accordance with the present invention.
FIG. 6 is an enlarged fragmentary perspective view of a section of the clear liquid effluent trough illustrating an orifice gate in its closed position in solid lines and in its open position in phantom lines.

Effluent trough 80 is preferably positioned adjacent side wall 16 in a downstream section of tank 32. Trough 80 defines an elongated open channel 82 defined by side walls 84 and 86 and a bottom wall 88. In the instance where channel 14 has an inclined side wall 16, the side wall 84 and bottom wall 88 are preferably oriented in contact therewith, as best seen in FIG. 7. Side wall 84 preferably extends vertically upward from bottom wall 88. Channel 82 has an upstream section 90 extending from and closed off by end wall 44 and a downstream section 92 which terminates intermediate end walls 42 and 44 and is closed off by an end wall 94. The downstream section 92 may be formed as a Parshall flume, as is well known in the art. A plurality of longitudinally spaced openings 96 are formed in side wall 86 for withdrawing a clear liquid stream from tank 32 into channel 82. Openings 96 are preferably vertically oriented such that a center line through the centers of the openings 96 inclines upwardly from upstream section 90 towards downstream section 92, as best seen in FIG. 5, such that the number of openings 96 submerged in communication with the clear liquid stream in tank 32 is proportional to the volume of liquid entering tank 32. The upstream openings 96 are preferably provided with control gates 98 to selectively close off selected one or ones of said orifices for reasons which will hereinbelow become more apparent. As best seen in FIGS. 5 and 6, in accordance with a preferred embodiment, gates 98 comprise a gate 100 which is secured to and pivoted by a control bar 102 between a closed position, as shown in solid lines in FIG. 6, and an open position, as shown in phantom lines in FIG. 6. Control bar 102 extends through a corresponding slot 103 formed in a flange extending outwardly from side wall 86. An elongated opening 105 is preferably formed in side wall 86 above the elevation of openings 96.

Referring to FIG. 5, a floating scum baffle arrangement 104 is preferably provided in separator 30 to preclude the entry of floating matter through openings 96. A preferred embodiment of scum baffle arrangement 104 comprises a scum baffle 106, made from a floating material, such as polypropylene, or the like, which is pivotally secured to side wall 86 at 108 in a suitable manner. Floating scum baffle arrangement 104 precludes the passage of matter floating at the surface of the clear liquid stream through openings 96 into channel 82.

Referring to FIGS. 3, 4 and 8, a surface skimmer arrangement 110 is preferably provided in separator 30 to remove any matter floating above the surface of the clear liquid stream in tank 32. A surface skimmer effluent port 112 is provided through an upper portion of side wall 38 adjacent its intersection with end wall 44, through which floating solid particulates pass back into the mixed liquid flow path in channel 14. As best seen in FIG. 8, in accordance with a preferred embodiment, a floating skimmer weir 114, constructed from a floating material such as polypropylene, or the like, is suitably shaped to be received between baffles 46 and 115, and side wall 38 so as to permit vertical movement thereof in closing relationship to port 112. Skimmer weir 114 has a notch 116 defining a horizontal surface 118 formed therein, which communicates with port 112 and thereby serves to maintain the lower elevation of port 112 at a fixed distance (approximately one inch) below the level of the clear liquid stream in separator 30, irrespective of the liquid level in separator 30. Floating matter and liquid above the elevation of surface 118 is directed through notch 116 and port 112 back into channel 14.

An effluent pipe or conduit 120 is provided to withdraw clear liquid effluent from the downstream section 92 of trough 80.

Completing the description of the construction of a preferred embodiment of separator 30, a plurality of clean out ports 122 and associated control gates 124 is preferably provided to permit the periodic flushing of tank 32. Ports 122 are preferably provided at approximately twenty foot intervals along the length of separator 30 through side wall 38 and a port 122 is preferably provided through end walls 44. Suitable control gates 124 are provided to open and close ports 122, of similar construction and operation as control gate 52.

In operation of the system 10 illustrated in FIGS. 1–9, wastewater is introduced into channel 14 through inlet conduit 20. The brush aerators 24 cause the mixed liquor within channel 14 to flow in a continuous substantially closed flow path, as indicated by arrows 23 in FIG. 1, at a sufficient velocity to prevent settling of suspended solid particulates. The mixed liquor has a concentration of solid particulates therein to cause a mutual attraction of the solid particulates and thereby creates a flock structure which substantially flows as a liquid mass. As the mixed liquor travels through the channel, oxygen is induced and dissolved into the mixed liquor flow path by the brush aerators 24, whereby the micro-organisms use the dissolved oxygen to metabolize the pollutants and create additional micro-organisms in a well known manner. As described hereinabove, the positioning of inlet conduit 20 relative to the initial return bend of the oxidation ditch, facilitates the mixing of the incoming wastewater as it passes around the return bend.

As the mixed liquor flows past the downstream end of separator 30, the inclination of the end wall 44 to the stream lines of the flow in channel 14 causes the turbulent current to flow smoothly past effluent port 72. The velocity of the flow path in channel 14 past effluent port 72 results in an area of lower head adjacent the effluent port 72 causing a portion of the mixed liquor to be drawn into separator 30 through inlet port 50 at the upstream end of separator 30. Although not specifically shown, the pressure head of the mixed liquor at the inlet port 50 may be increased by creating backflow at the edge of separator 30 or by baffles.

The influent stream of mixed liquor entering inlet port 50 at the upstream section of flow zone 34 of tank 32 flows in a substantially horizontal flow path towards the downstream section of zone 34 at a velocity which substantially precludes solid particulates from settling within the influent stream and which maintains the flock structure thereof. As the influent stream flows towards the downstream section of zone 34, clear liquid is caused to separate upwardly to form a clear liquid stream positioned above a flowing flock laden stream. Referring to FIG. 2, the clear liquid stream is schematically indicated above interface line 130 and the flock laden stream is schematically indicated below line 130. The flowing flock structure mass being heavier than the flowing liquid tends to float the liquid above the flock structure mass. As the stream moves along the length of flow zone 34, the flow regime tends to pass from turbulent to laminar because of the thixotropic change of the flock structure mass as a result of the solids tending to exhibit thixotropic characteristics as they become more concentrated. As depicted in FIG. 2, the clear liquid stream becomes larger in cross section and the cross section of the flock laden stream becomes smaller in cross section as they flow the length of flow zone 34. The velocity of the mixed liquor flow through separator 30 may be controlled by controlling the opening sizes of inlet port 50 and effluent port 72 respectively via control gate arrangements 52 and 74.

At least a portion of the clear liquid stream is withdrawn from separator 30 through effluent trough 80 and effluent pipe 120 in a manner which will hereinbelow be further discussed. The remaining clear liquid stream and the flock laden stream are withdrawn from separator 30 through effluent port 72 and directed back into the mixed liquor flow path in channel 14. As more clear liquid is withdrawn through effluent trough 80 relative to the quantity of flock laden stream withdrawn through effluent port 72, the interface line 130 rises. Accordingly, the elevation of the interface line 130 can be controlled by controlling the relative quantities of clear liquid and flock laden liquid withdrawn from separator 30. It is further important to control the relative velocities between the clear liquid stream and the flock laden stream so as not to exceed the velocity of shear of the flock laden stream, otherwise solids laden liquid will be sheared off the top of the flock laden stream into the clear liquid stream. The velocity of the flock laden stream is preferably maintained at a greater velocity than the velocity of the clear liquid stream.

As the liquid flows horizontally through separator 30, a thin layer of low specific gravity solids forms on top of the clear liquid stream. In order to avoid the build-up of such solids in separator 30, the upper surface of the clear liquid stream is skimmed off and directed out of separator 30 through opening 112 and back into channel 14, in a manner as discussed hereinabove. The passage of such solids into effluent trough 80 is precluded by scum baffle arrangement 104 in a manner as discussed hereinabove.

The clear liquid stream can be withdrawn from separator 30 in the conventional manner over a weir. However, as described above, in accordance with the invention the clear liquid stream is withdrawn in a unique manner through clear liquid effluent trough 80. The clear liquid stream from the downstream section of zone 34 enters effluent trough 80 through the openings 96 which are submerged, or partially submerged, in the clear liquid stream. Since the openings 96 are at different elevations, the liquid level in separator 30, and thus the liquid level in channel 14, are proportional to the volume of wastewater entering channel 14 through influent conduit 20. The size, spacing and elevation of openings 96 are selected to match the proper submergence of the brush aerators 24 and thereby provide the required amount of oxygen for the flow through channel 14. Put another way, as the flow rate through influent conduit 20 increases and decreases, the liquid level in channel 14, and the submergence of brush aerators 24, respectively increase and decrease. Accordingly, the liquid level on the brush aerators 24 is matched to the volume of wastewater entering channel 14 so that the required amount of oxygen is provided at flow rates varying from low flow rates to the average daily flow rate. Should the flow rate exceed the average daily flow rate, the liquid level in separator 30 rises slightly and passes over the elongated weir at opening 105 to maintain a maximum liquid level in separator 30. As this weir is relatively long, the level change in channel 14 for such increased flow is minimal and the brush aerators 24 continue to provide maximum oxygen output without raising the liquid level on the brush aerators higher.

In accordance with a preferred embodiment of the invention, the openings 96 adjacent the downstream section of separator 30 are provided with control gates 98 to permit selective closing of the lowermost openings 96 and thereby permit selective control of the liquid level in separator 30, and thus channel 14. In so doing, the oxygen induced into the mixed liquor flow path in channel 14 may be selectively increased as necessary to optimize the biological process.

The location of separator 30 in channel 15 has certain optimal constraints. The separator is preferably not closer than thirty feet from the circulation device, such as brush aerator 24. This gives the flow path sufficient time to level out and become less turbulent before reaching separator 30.

The nature of the streaming specific gravity separator process makes the shape of separator 30 ideally long and narrow. Channel 14 of oxidation ditch 12 also being long lends the two to being ideally matched. The separator 30 imparts little interference with the flow in channel 14. Further, there is very little, if any, additional head imparted on the brush aerators 24, or conversely, there is little reduction in velocity of the flow path that might result in solids settling. The narrow width of separator 30 enhances maintenance and operation by facilitating access thereto.

From a biological viewpoint, separator 30 is an ideal device. The biological process is preferably designed to keep the organisms supplied with the proper level of oxygen. Any lowering of the level below one mg/l of dissolved oxygen is reported to impose the optimum biological process. Separator 30 has a relatively high sludge velocity and a sludge retention time of around fifteen minutes. In a typical oxidation ditch the travel time of the mixed liquor around the ditch is around ten minutes. Thus, the separator acts as if it were part of the ditch and the area contained therein can be classified as ditch volume in the design of the system. The short retention time of the mixed liquor in the separator prevents the dissolved oxygen level from dropping very low, in fact, it does not drop much lower than the dissolved oxygen level between the brush aerators 24 in the ditch. In view of the above, the effective oxidation ditch volume is not reduced by separator volume, which permits the oxidation ditch to be designed in a typical manner. Further, by having less total volume in the treatment process, and yet still maintaining a twenty four hour retention in the aeration section of the oxidation ditch, there are less organisms and thus less sludge for disposal.

Figure 10:
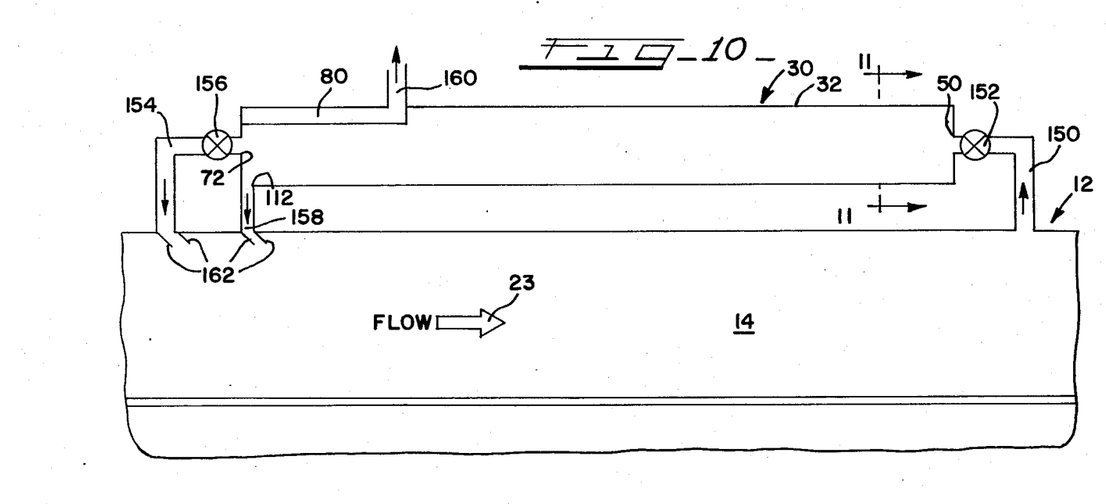
FIG. 10 is a schematic top plan view of an alternative preferred embodiment of the invention wherein the streaming specific gravity separator of the present invention is positioned outside of an oxidation ditch.
Figure 11:
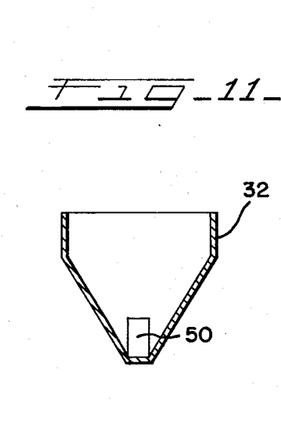
FIG. 11 is an enlarged cross sectional view taken along line 11—11 of FIG. 10.

Referring to FIGS. 10 and 11, an alternative preferred embodiment of the invention is schematically represented depicting a portion of a system wherein the separator 30 is positioned outside of the oxidation ditch 12; the portions thereof which correspond to portions of the embodiment depicted in FIGS. 1-9 are identified by the same reference numeral. The flow of mixed liquor in channel 14 of oxidation ditch 12 is as discussed hereinabove and indicated by the directional arrow 23. Separator 30 is suitably positioned exterior of the oxidation ditch and may be generally of the same construction as discussed hereinabove except as hereinbelow specifically indicated. As seen in FIG. 11, tank 32 is preferably of a hopper-shaped cross section to facilitate flow of mixed liquor influent thereinto and flock laden effluent therefrom. Mixed liquor is removed from the flow path in channel 14 and directed into the upstream section of separator 30 through an influent conduit or channel 150, having a first end in fluid communication with channel 14 and a second end in communication with an influent port 50 associated with the upstream section of tank 32. Conduit 150 is preferably provided with a suitable control valve 152 to control the flow rate of mixed liquor into tank 32. The flow through tank 32 is substantially the same as discussed hereinabove. That is, as the mixed liquor flows in a substantially horizontal flow path towards the downstream section of tank 32, clear liquid is caused to separate upwardly to form a clear liquid stream positioned above a flowing flock laden stream.

The downstream section of tank 32 is provided with a flock laden stream effluent port 72 in fluid communication with a lower portion thereof for receipt of the flock laden stream therethrough in a similar manner as discussed hereinabove. The flock laden stream withdrawn from separator 30 through port 72 is directed back into channel 14 through a conduit or channel 154, having a first end in fluid communication with port 72 and a second end in fluid communication with channel 14. Conduit 154 is preferably provided with a suitable control valve 156 to control the flow rate of the flock laden stream withdrawn from separator 30. Control valves 152 and 156 serve the same purposes as control gates 52 and 74, as discussed hereinabove.

Separator 30 is preferably provided with a surface skimmer arrangement (not shown) of similar design as surface skimmer arrangement 110, as discussed hereinabove. The floating matter and liquid skimmed off is directed through opening 112 in an upper portion of the downstream section of tank 32 into a conduit or channel 158 and back into channel 14.

Separator 30 is preferably provided with a clear liquid effluent trough 80 of generally similar construction as discussed hereinabove. Effluent trough 80 receives and directs at least a portion of the clear liquid stream from tank 32 through effluent conduit 160. Further, as hereinabove discussed, effluent trough 80 also varies the liquid level in tank 32 and channel 14 in proportion to the volume of wastewater entering oxidation ditch 12 and thereby controls the rate of oxygen transfer into the mixed liquor flow path.

As seen in FIG. 10, baffles 162 are preferably provided in ditch 12 to cause the turbulent current in the flow path in channel 14 to flow smoothly past conduits 154 and 158. The velocity of the flow path in channel 14 past conduit 154 results in an area of lower head adjacent conduit 154 causing a portion of the mixed liquor from channel 14 to be drawn into separator 30 through inlet conduit 150 at the upstream end of separator 30.

Figure 12:
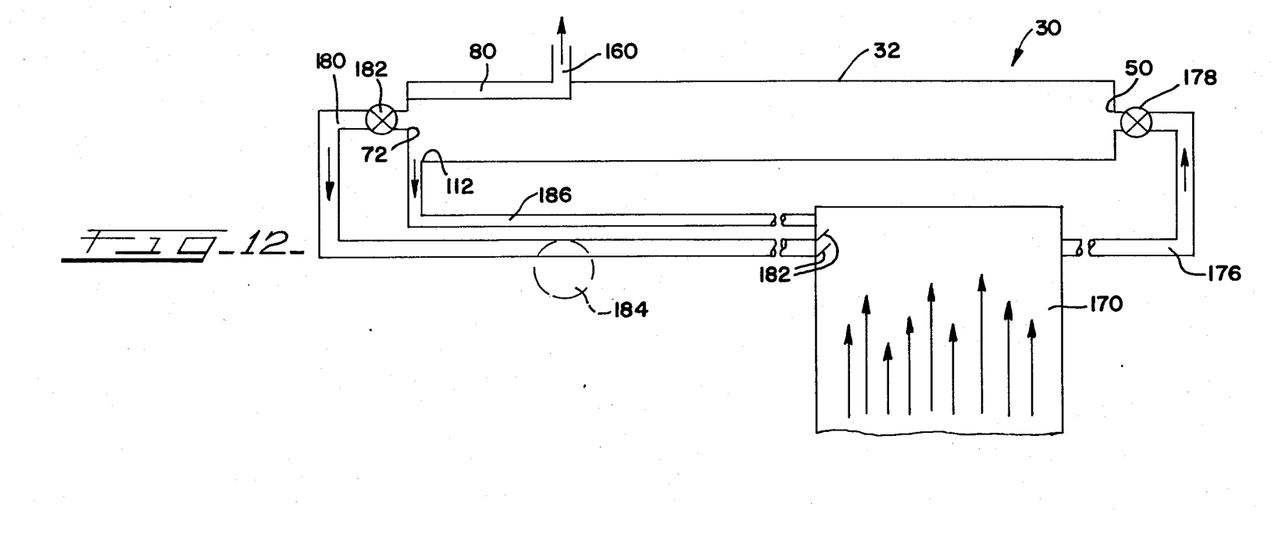
FIG. 12 is a schematic top plan view of another alternative preferred embodiment of the invention wherein the streaming specific gravity separator of the present invention is utilized in combination with an aeration basin shown in an elevation orientation.

Referring to FIG. 12, a further alternative preferred embodiment of the invention is schematically represented depicting an aeration tank system wherein separator 30 is used in combination with a conventional aeration tank or basin 170 (shown in elevation); the portions thereof which correspond to portions of the embodiments in FIGS. 1-11 are identified by the same reference numeral. Wastewater to be treated is introduced into basin 170 through a suitable influent conduit (not shown). The wastewater is mixed with the circulating mixed liquor and is aerated in basin 170 by air emanating from suitable diffuser pipes (not shown) located in a lower portion of basin 170 in a well known manner.

Mixed liquor from an upper portion of basin 170 is drawn into influent conduit 176, having a first end preferably in fluid communication with an upper portion of basin 170 and a second end preferably in fluid communication with a lower portion of the upstream end of separator 30. Influent conduit 176 is provided with a control valve 178 to control the flow rate of mixed liquor therethrough. Separator 30 is preferably of generally similar construction and operation as the separators 30 as described hereinabove with regards to the other preferred embodiments of the invention, and the corresponding parts thereof are indicated with the same reference numerals. It should be noted however, that, it is not necessary to incorporate the level control features of the clear liquid effluent trough 80 in this embodiment, as the volume of oxygen imparted into the mixed liquor in basin 170 is not necessarily proportional to the liquid level in basin 170, as is the case in the oxidation ditch 12 in the other embodiments.

A flock laden stream effluent conduit 180 is provided at the upstream section of tank 32, having a first end in fluid communication with a lower portion of the downstream section of tank 32 and a second end in fluid communication with an upper portion of basin 170. Effluent conduit 180 is preferably provided with a control valve 182 to control the flow rate of flock laden liquid from separator 30 back into basin 170. The flow through separator 30 may either be flow induced as in the other embodiments and/or induced by a pump means. Upwardly inclined baffles 182 may be provided in basin 170 adjacent conduit 180 to cause the flow path in basin 170 to flow smoothly past conduit 180 and result in an area of lower head adjacent conduit 180 causing a portion of the mixed liquor in the basin to be drawn into separators 30 through influent conduit 176. In addition to the induced flow, or as an alternative to induced flow, a suitable pump means 184 may be provided in conduits 176 or 180 to create or assist the flow through separator 30 in a well known manner. In a similar manner as discussed hereinabove, control valves 178 and 182 are utilized to control flow through separator 30. Further, separator 30 is preferably provided with a surface skimmer arrangement (not shown) of similar design as surface skimmer arrangement 110, as discussed hereinabove. The floating matter and liquid skimmed off is directed through an opening or port 112 in an upper portion of the downstream section of tank 32 into a floating solid particulates conduit 186 and back into basin 170.

Figures 13, 14:
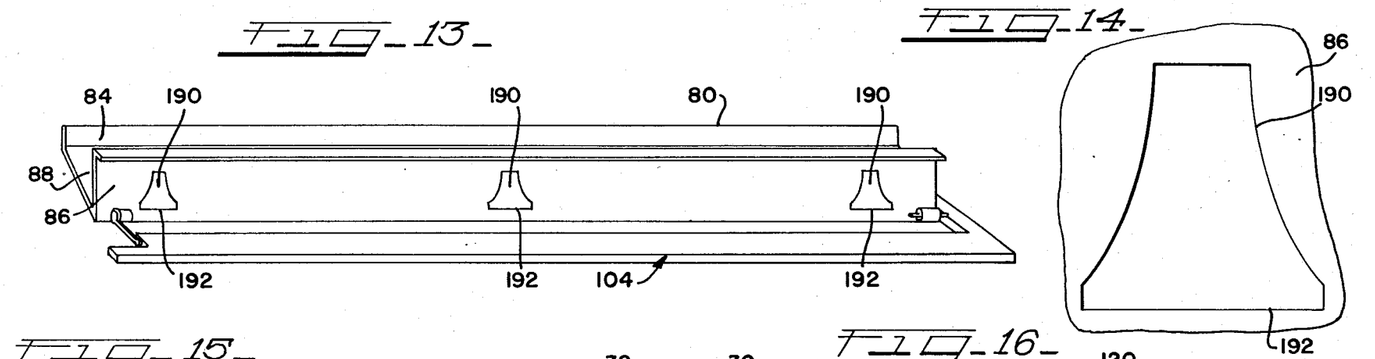
FIG. 13 is a fragmentary perspective view of an alternative preferred embodiment of the clear liquid effluent trough and scum baffle arrangement of the separator.
FIG. 14 is an enlarged elevational view of an exemplary Rettger proportional flow weir opening.

Referring to FIGS. 13-16, alternative preferred embodiments of the clear liquid effluent trough 80 are illustrated for use in separator 30. These embodiments utilize one or more proportional flow or characterized weirs 190 in place of the openings 96, as described hereinabove, to vary the liquid level in tank 32 and consequently channel 14 in proportion to the flow of wastewater into channel 14. Referring to FIG. 14, the shape of a typical Rettger proportional flow weir opening 190 is shown wherein the horizontal cross section therethrough decreases as it extends vertically upward.

Referring to FIG. 13, in accordance with one alternative embodiment, effluent trough 80 is of the same construction as discussed hereinabove with the openings 96 replaced by a plurality of spaced apart proportional flow weir openings 190, preferably numbering about two to five. The base portions 192 of openings 190 are at a common elevation with regards to the liquid level in tank 32 such that they are submerged at minimum flow rates through the system. Although not specifically shown, the base portions 192 of openings 190 may be provided with means to adjust the elevation thereof to compensate for varying minimum flow rates through the system. The weir openings 190 are designed to raise the liquid level in the tank 32 and the channel 14 in proportion to the flow rate of wastewater entering the system. The linear height in channel 14 matches the oxygen transfer of the brush aerators so that they provide the required oxygen at all flow levels. By matching the level of oxygen imparted into the mixed liquor to the flow rate, a minimum amount of energy is consumed. This effluent trough arrangement may be utilized in systems wherein the separator 30 is inside or outside of the oxidation ditch 12.

Figure 15:
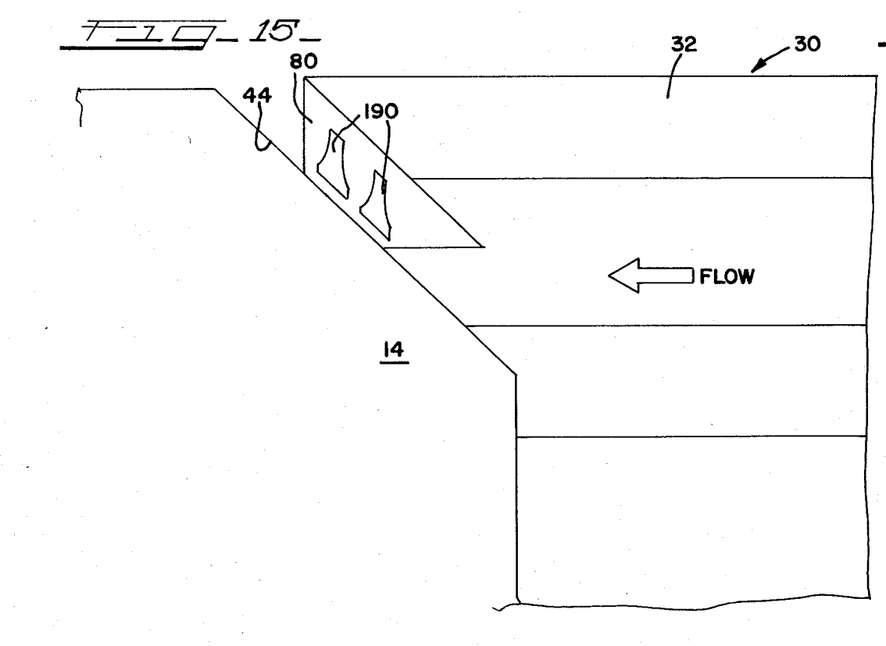
FIG. 15 is a fragmentary schematic perspective view of another preferred embodiment of the clear liquid effluent trough of the separator.

Referring to FIG. 15, a further alternative embodiment of the clear liquid effluent trough 80 is illustrated wherein the effluent trough is positioned transversely in tank 32 of separator 30 parallel to end wall 44. The trough is provided with a plurality of proportional flow weir openings 190 in much the same manner as discussed immediately hereinabove. The open end of trough 80 communicates with an effluent conduit (not shown) in a suitable well known manner. The utilization of proportional flow weir openings 190 in place of the openings 96, permits the trough 80 to be of reduced length and thereby may be positioned across the width of the tank 32.

Figure 16:
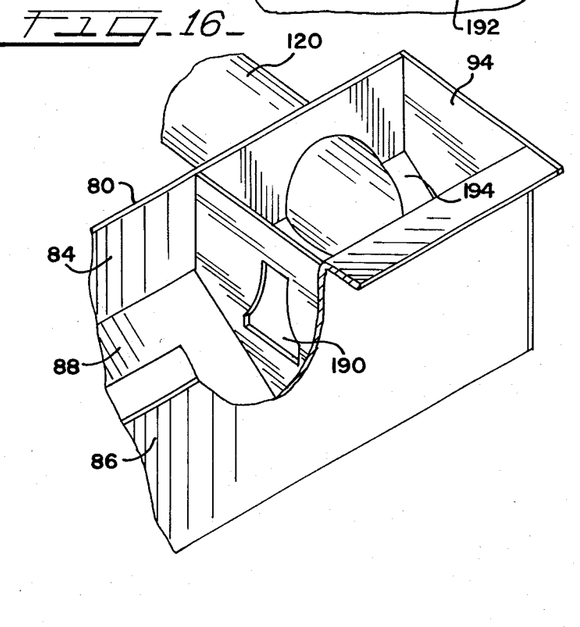
FIG. 16 is a fragmentary pespective view of a portion of a further preferred embodiment of the clear liquid effluent trough of the separator.

An additional preferred embodiment of the clear liquid effluent trough 80 is illustrated in FIG. 16. In this embodiment the Parshall flume 92, as discussed hereinabove, is replaced with a proportional flow weir opening 190 in communication with the downstream end of the effluent trough 80. The means of passing the clear liquid stream into trough 80 may be through any conventional means, such as submerged orifices (not shown). However, as the clear liquid exits the trough through opening 190, the liquid level therein is controlled in much the same manner as discussed hereinabove. The clear liquid passing through opening 190 is directed into chamber 194 and exits the system through conduit 120.

It will be readily observed from the foregoing detailed description of the invention and from the illustrated embodiments thereof that numerous variations and modifications may be effected without departing from the true spirit and scope of the novel concepts and principles of this invention.

What is claimed is:

1. In a biological aerobic treatment process wherein oxygen is induced into a mixed liquor flow path within an oxidation ditch, a method for automatically varying the volume of oxygen induced into the mixed liquor flow path in proportion to the volume of wastewater entering the oxidation ditch, comprising the following steps:
   (a) providing a first means for inducing oxygen into the mixed liquor flow path in a volume proportional to the level of the mixed liquor flow path in the oxidation ditch; and
   (b) providing proportional flow weir means for withdrawing liquid from the oxidation ditch in a manner which automatically varies the level of mixed liquor within the oxidation ditch in direct proportion to the volume of wastewater entering the oxidation ditch.

2. The method as defined in claim 1 wherein the first means is a rotating brush aerator means extending downwardly into the mixed liquor flow path for inducing a volume of oxygen into the mixed liquor flow path in proportion to the depth that the brush aerator means is submerged in the mixed liquor flow path.

3. The method as defined in claim 1 wherein the weir means includes a characterized weir for withdrawing liquid from the oxidation ditch through a plurality of spaced apart openings formed therein that are at different elevations so as to automatically vary the level of the mixed liquor flow path in the oxidation ditch in proportion to the volume of wastewater entering the oxidation ditch.

4. A method of separating clear liquid from wastewater in a streaming specific gravity separator, comprising the following steps:
   (a) establishing an influent stream of wastewater wherein the concentration of solid particulates therein is sufficient to cause a mutual attraction of the solid particulates and thereby create a flock structure of the solid particulates which substantially flows as a liquid mass;
   (b) flowing the influent stream in a substantially horizontal direction from an upstream section to a downstream section of a horizontally elongated streaming specific gravity separator tank at a velocity which substantially precludes solid particulates from settling within the influent stream and which maintains the flock structure of the solid particulates within the influent stream such that as the influent stream flows towards the downstream section of the tank clear liquid separates upwardly to form a clear liquid stream positioned above a flowing flock laden stream;
   (c) maintaining a velocity of the flock laden stream which is greater than the velocity of the clear liquid stream such that the relative velocity between the clear liquid stream and the flock laden stream is maintained so as not to exceed the velocity of shear of the flock laden stream and thereby preclude shearing off of an upper portion of the flock laden stream into the clear liquid stream;
   (d) withdrawing at least a portion of the clear liquid stream from an upper portion of the downstream section of the tank; and
   (e) withdrawing the flock laden stream from a lower portion of the downstream section of the tank.

5. The method as defined in claim 4 wherein as the influent stream flows through the tank a floating particulates layer is formed in an upper portion of the clear liquid stream and further including the step of separately withdrawing at least a portion of the floating particulates layer from an upper portion of the downstream section of the tank.

6. The method as defined in claim 4 wherein the cross sectional area of the clear liquid stream increases and the cross sectional area of the flock laden stream decreases as the influent stream flows in a direction from the upstream section of the tank towards the downstream section of the tank.

7. The method as defined in claim 4 wherein the retention time of the solid particulates in the separator is approximately fifteen minutes.

8. A streaming specific gravity separator apparatus for separating clear liquid from a wastewater influent stream having a concentration of solid particulates therein sufficient to cause a mutual attraction of the particulates and thereby create a flock structure which substantially flows as a liquid mass, comprising:
   (a) an elongated longitudinally extending tank having an upstream section and a downstream section defined by a pair of spaced apart side walls and a floor connected to said upstream and downstream sections and said side walls;
   (b) an inlet port for directing said influent stream into said tank adjacent said upstream section;
   (c) flow control means for causing the influent stream to flow in said tank from said upstream section towards said downstream section in a substantially horizontal flow path at a velocity which substantially precludes solid particulates from setting within said influent stream and which maintains the flock structure of said influent stream such that as said influent stream flows towards said downstream section clear liquid separates upwardly to form a clear liquid stream positioned above a flowing flock laden stream in a manner wherein the relative velocity between the clear liquid stream and the flock laden stream is maintained so as not to exceed the velocity of shear of the flock laden stream and thereby preclude shearing off an upper portion of the flock laden stream into the clear liquid stream;
   (d) a clear liquid effluent trough means associated with said downstream section for receiving and directing at least a portion of said clear liquid stream from said tank; and
   (e) a flock laden stream effluent port associated with said downstream section for directing said flock laden stream from said tank.

9. The apparatus as defined in claim 8 wherein said flow control means includes first control means associated therewith to control the flow rate of said influent stream directed through said inlet port.

10. The apparatus as defined in claim 9 wherein said first control means is a first flow control gate which selectively controls the size of said inlet port.

11. The apparatus as defined in claim 8 wherein said flow control means includes second control means associated therewith to control the flow rate of said flock laden stream through said flock laden stream effluent port.

12. The apparatus as defined in claim 11 wherein said second control means is a second flow control gate which selectively controls the size of said flock laden stream effluent port.

13. The apparatus as defined in claim 8 wherein said inlet port is located at a lower portion of said upstream section.

14. The apparatus as defined in claim 13 wherein said trough has a plurality of longitudinally spaced openings formed therein at least some of which are positioned below the surface of said clear liquid stream and in fluid communication therewith.

15. The apparatus as defined in claim 8 wherein said flock laden stream effluent port is located at a lower portion of said downstream section.

16. The apparatus as defined in claim 8 wherein said clear liquid effluent trough means includes an elongated trough positioned in an upper portion of said downstream section which extends downwardly into said clear liquid stream.

17. The apparatus as defined in claim 16 wherein said trough extends longitudinally within said downstream section of said tank.

18. The apparatus as defined in claim 16 wherein said trough extends transversely within said downstream section of said tank.

19. Apparatus for biological aerobic treatment of wastewater wherein oxygen is induced into a flowing mixed liquor stream, comprising:
  (a) means for flowing a mixed liquor stream having a concentration of solid particulates therein to cause a mutual attraction of the solid particulates and thereby create a flock structure which substantially flows as a liquid mass in a continuous substantially closed flow path at a sufficient velocity to prevent settling of suspended solid particulates;
  (b) means for introducing wastewater influent into said mixed liquor flow path;
  (c) means for introducing oxygen into said mixed liquor flow path;
  (d) means for removing mixed liquor from said mixed liquor flow path;
  (e) means for directing said mixed liquor removed from said mixed liquor flow path through a streaming specific gravity separator comprising:
    (i) an elongated longitudinally extending tank having an upstream section and a downstream section defined by a pair of spaced side walls and a floor connected to said upstream and downstream sections and said side walls;
    (ii) an inlet port for receiving said mixed liquor removed from said mixed liquor flow path;
    (iii) flow control means for directing said mixed liquor from said inlet port to flow in said tank from said upstream section towards said downstream section in a substantially horizontal flow stream at a velocity that substantially precludes solid particulates from settling within said flow stream and that maintains the flock structure of said mixed liquor such that as said mixed liquor flows towards said downstream section clear liquid separates upwardly to form a clear liquid stream positioned above a flowing flock laden stream in a manner wherein the relative velocity between the clear liquid stream and the flock laden stream is maintained so as not to exceed the velocity of shear of the flock laden stream and thereby preclude shearing off an upper portion of the flock laden stream into the clear liquid stream;
    (iv) a clear liquid effluent trough means associated with said downstream section for receiving and directing at least a portion of said clear liquid stream from said tank; and
    (v) a flock laden effluent port associated with said downstream section for directing said flock laden stream from said tank; and
  (f) means for directing at least a portion of said flock laden stream from said tank into said mixed liquor flow path.

20. The apparatus as defined in claim 19 wherein said separator is positioned within said mixed liquor flow path such that said floor is submerged therein and the upper edges of said side walls extend above the surface thereof.

21. The apparatus as defined in claim 20 wherein said flock laden stream effluent port is formed in a lower portion of one of said side walls at said downstream section.

22. The apparatus as defined in claim 21 wherein said separator is oriented within said mixed liquor flow path such that said downstream section is upstream from said upstream section and said flock laden stream passes through said flock laden effluent port into said mixed liquor flow path.

23. The apparatus as defined in claim 22 wherein said downstream section has a rear end wall extending between said side walls defining a baffle portion that extends beyond said side wall through which said flock laden stream effluent port extends so as to divert said mixed liquor flow path around said flock laden stream effluent port.

24. The apparatus as defined in claim 23 further including a baffle means extending outwardly from said side wall such that said flock laden stream effluent port is positioned between said baffle portion and said baffle means.

25. The apparatus as defined in claim 19 wherein said flow control means includes a first control means associated therewith to control the flow rate of said mixed liquor removed from said mixed liquor flow path through said inlet port.

26. The apparatus as defined in claim 25 wherein said first control means is a first flow control gate which selectively controls the size of said inlet port.

27. The apparatus as defined in claim 25 wherein said flow control means includes second control means associated therewith to control the flow rate of said flock laden stream through said flock laden stream effluent port.

28. The apparatus as defined in claim 27 wherein said second control means is a second flow control gate which selectively controls the size of said flock laden stream effluent port.

29. The apparatus as defined in claim 19 wherein said upstream section includes an upstanding front end wall extending between said side walls and said inlet port is located in a lower portion of said front end wall.

30. The apparatus as defined in claim 19 wherein said clear liquid effluent trough means includes an elongated trough positioned in an upper portion of said downstream section and extends downwardly into said clear liquid stream.

31. The apparatus as defined in claim 30 wherein said trough has an upstanding side wall through which a plurality of longitudinally spaced openings are formed therein, at least some of which are submerged below the surface of said clear liquid stream and in fluid communication therewith.

32. The apparatus as defined in claim 31 wherein at least some of said openings are at different vertical elevations so as to vary the elevation of the liquid levels in said tank and said mixed liquor flow path proportional to the flow rate of the wastewater influent introduced into said mixed liquor flow path.

33. The apparatus as defined in claim 32 wherein a center line through the centers of said openings inclines upwardly from said downstream section of said tank towards said upstream section of said tank.

34. The apparatus as defined in claim 32 wherein at least some of said openings are provided with means for selectively precluding liquid flow therethrough.

35. The apparatus as defined in claim 30 wherein said trough extends longitudinally within said downstream section of said tank.

36. The apparatus as defined in claim 30 wherein said trough extends transversely within said downstream section of said tank.

37. The apparatus as defined in claim 30 wherein said trough has at least one proportional flow weir formed therein in fluid communication with said clear liquid stream.

38. The apparatus as defined in claim 19 wherein a surface skimmer effluent port is provided in said downstream section for skimming off an upper layer of said clear liquid stream containing floating solid particulates.

39. The apparatus as defined in claim 38 wherein said surface skimmer effluent port has a floating skimmer weir means associated therewith to maintain the lower elevation of said surface skimmer effluent port at a substantially fixed distance below the upper surface of said clear liquid stream irrespective of the level of said clear liquid stream in said tank.

40. The apparatus as defined in claim 38 wherein said surface skimming effluent port extends through one of said side walls and directs liquid passing therethrough into said mixed liquor flow path.

41. The apparatus as defined in claim 40 wherein a baffle means extends outwardly from said side wall adjacent said surface skimming effluent port for diverting said mixed liquor flow path around said surface skimming effluent port.

42. The apparatus as defined in claim 19 wherein said mixed liquor flow path is contained within an elongated closed loop oxidation ditch defining a trough-like channel having a bottom and spaced upstanding inner and outer side wall.

43. The apparatus as defined in claim 42 wherein said separator is positioned within said flow path and is parallel to said outer side wall and extends a relatively short distance towards said inner side wall.

44. The apparatus as defined in claim 19 wherein said separator is positioned outside of said mixed liquor flow path.

45. The apparatus as defined in claim 44 including a flock laden effluent conduit having a first end in fluid communication with said flock laden effluent port and a second end in fluid communication with said mixed liquor flow path.

46. The apparatus as defined in claim 45 wherein said flow control means includes a control valve associated with said flock laden effluent conduit to control the flow of flock laden liquid therethrough.

47. The apparatus as defined in claim 44 including an influent conduit having a first end in fluid communication with said inlet port and a second end in fluid communication with said mixed liquor flow path.

48. The apparatus as defined in claim 47 wherein said flow control means includes a control valve associated with said influent conduit to control the flow of mixed liquor therethrough.

49. Apparatus for biological aerobic treatment of wastewater wherein oxygen is induced into a mixed liquor, comprising:
(a) an aeration basin having an inlet conduit for introducing wastewater thereinto, said aeration basin having a means for introducing oxygen into a circulating mixed liquor having a concentration of solid particulates therein to cause a mutual attraction of the solid particulates and thereby create a flock structure;
(b) means for removing mixed liquor from said aeration basin;
(c) means for directing said mixed liquor removed from said aeration basin through a streaming specific gravity separator comprising:
(i) an elongated longitudinally extending tank having an upstream section and a downstream section defined by a pair of spaced side walls and a floor connected to said upstream and downstream sections and said side walls;
(ii) an inlet port for receiving said mixed liquor removed from said mixed liquor flow path;
(iii) an influent conduit having a first end in fluid communication with said inlet port and a second end in fluid communication with said aeration basin;
(iv) flow control means for directing said mixed liquor from said inlet port to flow in said tank from said upstream section towards said downstream section in a substantially horizontal flow stream at a velocity that substantially precludes solid particulates from settling within said flow stream and that maintains the flock structure of said mixed liquor such that as said mixed liquor flows towards said downstream section clear liquid separates upwardly to form a clear liquid stream positioned above a flowing flock laden stream in a manner wherein the relative velocity between the clear liquid stream and the flock laden stream is maintained so as not to exceed the velocity of shear of the flock laden stream and thereby preclude shearing off an upper portion of the flock laden stream into the clear liquid stream;
(v) a clear liquid effluent trough means associated with said downstream section for receiving and directing at least a portion of said clear liquid stream from said tank;
(vi) a flock laden effluent port associated with said downstream section for directing said flock laden stream from said tank; and
(vii) a flock laden effluent conduit having a first end in fluid communication with said flock laden effluent port and a second end in fluid communication with said aeration basin; and
(d) means for directing at least a portion of said flock laden stream from said tank into said aeration basin.

50. The apparatus as defined in claim 49 wherein said flow control means includes a control valve associated with said influent conduit to control the flow of mixed liquor therethrough.

51. The apparatus as defined in claim 58 wherein said flow control means includes a control valve associated with said flock laden effluent conduit to control the flow of flock laden effluent therethrough.

52. The apparatus as defined in claim 58 wherein said flock effluent conduit has a pump means associated therewith for inducing flow through said separator.

53. The apparatus as defined in claim 58 wherein said aeration basin has baffle means positioned therein for inducing flow through said separator.

54. The apparatus as defined in claim 49 wherein a surface skimmer effluent port is provided in said downstream section for skimming off an upper layer of said clear liquid stream containing floating solid particulates.

55. The apparatus as defined in claim 54 including a floating skimmer weir means positioned adjacent said surface skimmer effluent port to maintain the lower elevation of said surface skimmer effluent port at a substantially fixed distance below the upper surface of said clear liquid stream irrespective of the level of said clear liquid stream in said tank.

56. The apparatus as defined in claim 54 including a floating solid particulates conduit having a first end in fluid commuication with said surface skimmer effluent port and a second end in fluid communication with said aeration basin.

* * * * *